United States Patent [19]

Graf

[11] 3,959,975

[45] June 1, 1976

[54] SOIL STABILIZATION BY ION DIFFUSION

[76] Inventor: Edward D. Graf, 1680 Bryant St., Daly City, Calif. 94015

[22] Filed: Sept. 18, 1972

[21] Appl. No.: 290,027

Related U.S. Application Data

[63] Continuation-in-part of Ser. No. 75,749, Sept. 25, 1970, abandoned.

[52] U.S. Cl. .................. 61/36 C; 61/36 B
[51] Int. Cl.$^2$ ............................... E02D 3/14
[58] Field of Search .................. 61/36 R, 35; 106/287 SS; 260/DIG. 14; 166/292; 404/75

[56] References Cited

UNITED STATES PATENTS

| | | | |
|---|---|---|---|
| 2,321,138 | 6/1943 | Grebe et al. | 166/292 |
| 2,437,387 | 3/1948 | Hodgson | 61/36 R |
| 2,893,166 | 7/1959 | Bavnin | 61/36 R |
| 2,898,706 | 8/1959 | Lyons | 61/36 R |
| 3,075,851 | 1/1963 | Hemwall | 106/287 SS |
| 3,201,268 | 8/1965 | Hemwall | 61/36 R |
| 3,288,040 | 11/1966 | Burrows | 404/75 |
| 3,377,180 | 4/1968 | James | 106/287 SS |
| 3,490,241 | 1/1970 | Kuhn | 61/1 R |

*Primary Examiner*—Paul R. Gilliam
*Assistant Examiner*—Alex Grosz
*Attorney, Agent, or Firm*—Townsend and Townsend

[57] ABSTRACT

A method for the stabilization of soils is described wherein an aqueous concentrate or powder of an organic or inorganic ionizable salt is applied to a soil to be stabilized, said salt when solubilized liberating ions which will interact with ions naturally present in the soil. The salt dissolves in the available ground water and migrates throughout the soil by physical diffusion and mass flow to stabilize the soil at a location spaced from the point of application as well as at the point of application.

13 Claims, No Drawings

SOIL STABILIZATION BY ION DIFFUSION

This application is a continuation-in-part of copending Patent application Ser. No. 75,749, filed Sept. 25, 1970 now abandoned.

This invention pertains to soil stabilization. More particularly, this invention pertains to a method for stabilizing soils by the addition thereto of certain ionizable salts in an aqueous concentrate or powder form.

In U.S. Pat. No. 3,490,241, a method of soil stabilization is described wherein an aqueous solution of from about 5% to 10% on a weight basis of certain ionized organic and inorganic salts is applied to a soil to be stabilized. The aqueous solution is distributed throughout the soil by physical diffusion and mass flow. Stabilization results from the exchange of ions with ions normally occurring in the soil. Rapid ion penetration to relatively great depths is facilitated by introducing the solution to the subsurface of the soil through holes bored in the surface and down to a suitable depth.

Because a 5% to 10% solution on a weight basis is employed, it is necessary to introduce relatively large volumes thereof to these holes, or alternatively use larger, or more closely spaced holes in order to achieve a sufficiently high and uniform ion concentration throughout the soil to insure the stabilization thereof. By resorting to the expediency of closely spaced apart holes, greater drilling times are required as more holes must be drilled to cover a specified area. Consequently, the expense of application is increased. Furthermore, by utilizing a great number of closely spaced holes, the structural integrity of the soil may be weakened, as the load bearing soil surface is reduced. Similar drawbacks are encountered with larger holes.

To prepare the aqueous solutions, it is necessary to use large volumes of water and relatively large capacity mixing vessels. For on-site construction, where water hook-ups may not be available, water must be transported to the site, thus further increasing application costs.

It is an object of this invention to provide a more efficient and less expensive method for introducing the desired ions into the soil to achieve soil stabilization.

It is a further object of this invention to provide an improved method for introducing the desired ions into the soil which requires the boring of fewer holes thereinto.

It is yet a further object of this invention to provide an improved method for introducing the desired ions into the soil whereby the need for relatively large volumes of water and large mixing vessels is eliminated.

In accord with these above objects, the present invention contemplates a method for stabilizing soil wherein an aqueous concentrate of certain ionizable salts is applied to the soil in order to effect soil stabilization. By applying the salts in concentrate form, water requirements are reduced. In general, the aqueous concentrate will contain about 15% or more of the ionizable salt on a weight basis. As less water is consumed than in the case of forming a 5 to 10% solution, less need be transported to the construction site, thus reducing water and hauling costs. Because of the higher concentrations which may be added at each application site, fewer application sites are required. Thus, if the salt is to be introduced to the subsurface of the soil through holes bored thereinto, fewer, and further spaced apart holes will suffice than is the case for salts applied as dilute aqueous solutions.

The term aqueous concentrate is used herein to designate both true solutions and slurries. At the low end of the concentration range, some of the salts contemplated will form a true solution, while others will form slurries wherein at least a portion of said salt is suspended in free solid form.

In a preferred embodiment, at least a portion of the ionizable salt added to the soil to be treated is applied in a free solid form. As used herein, the term free solid form refers to the undissolved solid form of the salt and designates a slurry or a powder as distinguished from a true solution. In the case of a slurry, the salt concentration will be above the saturation point. With more concentrated slurries less water is required and thus application costs are reduced. In the case of a powder, the need for water and mixing vessels is totally eliminated, thus reducing further the costs of application.

It was previously believed necessary to add a minimum amount of water to the ionizable salt to dissolve and thus ionize it, as well as to sufficiently saturate the soil to be treated so as to permit physical migration of the ions therethrough. Without the addition of this water, it was believed that soil stabilization could not be achieved. Accordingly, in U.S. Pat. No. 3,490,241, it is specifically noted that the aqueous solution should not exceed about 10% concentration on a weight basis.

Unexpectedly it has been discovered that the amount of ground water naturally present and bound in clay containing soil to be stabilized is sufficient to dissolve the ionizable salt and permit physical diffusion of the thus liberated ions. Thus, no water at all need be admixed with the salt prior to its application to the soil to be treated. The naturally occurring "bound water" which is present in all clay soils that are not in a rock form has been found to be sufficient to permit ionization of the stabilizing salt and migration of the ions through the soil particles. In many instances it may be expedient to slurry or partially dissolve the ionizable salt prior to application to a soil, but such a step is not essential and only facilitates the desired result. Similarly the presence of free water in the soil may expedite the process but is not necessary for effective use of the present process.

It is contemplated that the aqueous concentrate of the ionizable salt additionally contain a surfactant. Under certain circumstances the use of a surfactant may be indicated where it is desired to accelerate the penetration of the concentrate. In this case, both mass flow and ion diffusion serve to distribute the ions throughout the soil. The surfactant selected should be compatible with the chemistry of the soil and the ionic salt applied.

The method of this invention is most ideally suited to the treatment of clay containing soils. These soils often exhibit an expanding structure and increased plasticity in the presence of free water. They also have the ability to hold cations and anions which are exchangeable with any number of cations and anions, such as, for example, calcium, magnesium, potassium, ammonium and sodium, and such anions as sulfate and phosphate. Exchange with such ions stabilizes against soil expansion and increased plasticity which otherwise would occur in the presence of free water.

No two clay containing soils are exactly alike in their chemical makeup. As their compositions differ, so will their net charge as well as the types of cations and anions contained therein. For a particular soil in a given region, one salt may be more suitable than another. The determination of which salt will afford the greatest soil stabilization can be established by routine laboratory procedures. It may well be that no single ionizable salt is best suited. The admixture of two or more salts may be thus indicated for a given soil. By careful selection and combination of several salts, a standard formulation can be provided for effective treatment of a variety of soil types which may be encountered within a given geographical region or soil series.

The chemical materials for use in the present invention must be water soluble and ionizable therein. Any ionizable water soluble salt which yields ions which will diffuse through the soil and exchange, replace or otherwise react with naturally occurring ions in the soil to improve stability can be utilized. The trivalent metals are a preferred group for use in the present invention and are conveniently utilized as a metal salt such as ferric chloride, ferric oxide, aluminum chloride, or aluminum nitrate. Calcium chloride is another inorganic material that has been found to give advantageous results, as well as ammonium phosphate. Equally suitable are such salts as calcium orthophosphate and acid salts of low molecular weight amines containing up to 8 carbon atoms. Typical low molecular weight amines include ethylamine, propylamine, methylbutylamine, triethylamine, octylamine, methylisopropylamine, and the like.

As a further feature of the present invention, it is no longer required to add solubilizing acids to salts such as calcium orthophosphate in order to prepare them for addition to a soil. Overall costs of application are further reduced as the need for an additional ingredient, the acid, is eliminated, as well as the problems attendant with handling these materials at the construction site.

While we do not wish to be bound by the following theory, it is believed that cations of the chemical materials used, such as the trivalent cations, exchange with the naturally occurring cations in the soil. When so exchanged, it is believed that the new metal cations reduce the electrical repulsion between particles and/or inhibit the entrance of water and thereby prevent, or at least reduce, expansion of the soil particle lattice. In some cases, the anion of the salt may have a similar effect.

Generally, a soil will remain stable until it contains a certain minimum amount of water. In the presence of this minimum amount of water, the ionizable salts utilized herein dissolve, and the liberated ions migrate therethrough. It is thus further contemplated to add ionizable salts to relatively dry soils. As the moisture content of the soil increases, either slowly or as a result of, for example, a heavy rain, the applied salt will dissolve and liberated ions diffuse through the soil via the pore water to interact with the ions in the soil and thus prevent or reduce expansion, weakening, or plastic flow thereof.

The method of this invention is applicable for the strengthening of any load bearing or otherwise supportive soils. By converting expansive type to non-expansive type soils, better beds for building structures, underground pipes and highways, etc. are afforded. By reducing the plasticity of the soil with its attendant tendency to slip, soil slide hazards are reduced. This capacity to reduce slide hazards can readily be taken advantage of in highway construction, wherein the slope of hillside cuts are determined by the strength and plasticity of the soil. By treating the soil to strengthen and reduce its plasticity, steeper cuts may therefore be made. Construction costs are reduced as less cutting is required.

The following example is presented as an illustration of the present invention.

EXAMPLE

Tests were conducted to stabilize clay containing plastic subgrades under an asphalt highway pavement. Along 85 foot test sections, 6 inch auger holes were drilled through the paving at spacings on center of 12 feet. The following salts were slurried with one and one-half gallons of water prior to addition to these holes:

| Salt | Weight of Salt (in pounds) per hole |
| --- | --- |
| Ammonium phosphate | 9.0 |
| Calcium orthophosphate | 4.0 |
| Aluminum chloride | 3.5 |

Alternatively, dry powders or crystals of these salts were admixed with sand and placed in the holes, and then a small amount of water was added thereto. The holes were then back filled with a coarse sand to maintain the hole and prevent settlement of the asphalt.

Soil sampling was conducted at regular intervals for a period of one year. Observations of the test sections indicated less cracking of the areas treated than the adjoining untreated highway areas.

In general, the ionizable salt utilized in the method of this invention may be spread over the surface of the soil, poured into existing cracks present in the soil, or poured into holes bored into the soil. In the case of adding a powder to the soil through relatively deep bored holes, clumping of the powder may occur to block the hole and prevent filling thereof. It may thus be more desirable to slurry the salt prior to addition to the hole to facilitate filling.

In areas having a high ground water table, bored holes may fill with ground water before the ionizable salt can be added thereto. In this instance, it is contemplated that dry salt be added to the ground water in the hole and allowed to dissolve. The salt can be prepackaged in porous containers that will allow solution of the enclosed salt or in containers which will themselves dissolve when placed in water. If desired, each package could be weighted to sink to the bottom of the hole.

The amount of water to be added to form the slurry is not critical. As the slurrying of the salts merely expedites the filling of the bored holes in the soil, as little water as necessary need be added. The exact amount of course will be dependent upon the amount of salt to be added to each drilled hole. It may easily be decided by visual inspection when enough water has been added.

The depth and width to which the holes must be drilled also is not critical. The depth chosen will depend on the depth to which stabilization of the soil is desired. The width of the holes will be a function of the amount of material to be added, as well as the strength, hardness, moisture content, etc. of the soil.

Although the foregoing invention has been described in some detail by way of illustration and example for purposes of clarity of understanding, it is understood that certain changes and modifications may be practiced within the spirit of the present invention which is limited only by the scope of the appended claims.

What is claimed is:

1. In a process for stabilizing a clay containing soil wherein a chemical composition is distributed through said soil, the improvement comprising adding an aqueous concentrate to cavities in said soil, said concentrate containing about 15% or more on a weight basis of at least one water soluble, ionizable salt, the solubilized form of which provides soil strengthening ionic groups of the type that stabilize the soil particles by mechanisms including ion exchange with exchangeable ions naturally occurring in the soil, the active ion being present in an amount sufficient to stabilize soil being treated, the distribution of said ionic groups including diffusion through the soil by ionic migration through the bound water in said clay containing soil to stabilize the area of said migration.

2. The invention of claim 1 and wherein said concentrate is added as a slurry.

3. The process of claim 1 wherein said ionizable salt is selected from the group consisting of ammonium phosphate, calcium orthophosphate, ferric chloride, ferric oxide, aluminum chloride, calcium chloride, and aluminum nitrate.

4. The process in accordance with claim 1 wherein said salt is a salt of a low molecular weight amine having up to eight carbon atoms.

5. A method for treating a clay containing soil to reduce its tendency to flow or undergo hydrationally caused changes in form comprising applying a solid, water soluble, ionizable chemical composition to a soil to be treated through a plurality of holes bored into said soil, said chemical composition when dissolved liberating soil strengthening ionic groups of the type that stabilize the soil particles by mechanisms including ion exchange with exchangeable ions naturally occurring in the soil, the active ion being present in amounts sufficient to stabilize the soil being treated, the distribution of said ionic groups including diffusion through the soil by ionic migration through the bound water in said clay containing soil to stabilize the area of said migration.

6. The method of claim 5 wherein said solid salt is added to said soil in powder form.

7. The method of claim 5 wherein said ionizable chemical is selected from the group consisting of ammonium phosphate, calcium orthophosphate, ferric chloride, ferric oxide, aluminum chloride, calcium chloride, and aluminum nitrate.

8. The method in accordance with claim 5 wherein said ionizable chemical composition contains a salt of a low molecular weight amine having up to eight carbon atoms.

9. A method for stabilizing a clay containing soil whereby its tendency to flow or undergo hydrationally caused expansion or contraction is reduced, comprising the step of applying a chemical composition to cavities in the soil, at least a portion of which is in free solid form, said chemical composition containing soil strengthening ionic groups of the type that stabilize the soil particles by mechanism including ion exchange with exchangeable ions naturally occurring in the soil, the active ion being present in an amount sufficient to stabilize the soil being treated, the distribution of said ionic groups including diffusion through the soil by ionic migration through the bound water in said clay containing soil to stabilize the area of said migration.

10. The method in accordance with claim 9 wherein said cavities comprise spaced apart holes drilled into the soil to a desired depth and into which said chemical composition is introduced.

11. The method in accordance with claim 9 wherein said chemical composition is applied to the soil in powdered form.

12. The method in accordance with claim 9 wherein said chemical composition includes at least one salt selected from the group consisting of ammonium phosphate, calcium orthophosphate, ferric chloride, ferric oxide, aluminum chloride, calcium chloride and aluminum nitrate.

13. The method in accordance with claim 9 wherein said chemical composition contains a salt of a low molecular weight amine having up to eight carbon atoms.

* * * * *